(12) United States Patent
Sue et al.

(10) Patent No.: US 12,339,519 B2
(45) Date of Patent: Jun. 24, 2025

(54) OPTICAL UNIT

(71) Applicant: NIDEC SANKYO CORPORATION, Nagano (JP)

(72) Inventors: Takeshi Sue, Nagano (JP); Tsutomu Arai, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 742 days.

(21) Appl. No.: 17/528,116

(22) Filed: Nov. 16, 2021

(65) Prior Publication Data

US 2022/0163759 A1    May 26, 2022

(30) Foreign Application Priority Data

Nov. 26, 2020 (JP) .................................. 2020-195991

(51) Int. Cl.
| | |
|---|---|
| *G02B 7/18* | (2021.01) |
| *G02B 7/00* | (2021.01) |
| *G02B 7/02* | (2021.01) |
| *G02B 13/00* | (2006.01) |
| *H04N 23/51* | (2023.01) |

(52) U.S. Cl.
CPC ........... *G02B 7/1805* (2013.01); *G02B 7/003* (2013.01); *G02B 7/026* (2013.01); *G02B 13/0065* (2013.01); *H04N 23/51* (2023.01)

(58) Field of Classification Search
CPC ...... G02B 7/1805; G02B 7/003; G02B 7/026; G02B 13/0065; H04N 23/51
USPC ......................................................... 359/831
See application file for complete search history.

(56) References Cited

U.S. PATENT DOCUMENTS

| | | | |
|---|---|---|---|
| 10,983,303 B2 | 4/2021 | Jung et al. | |
| 11,353,680 B2 | 6/2022 | Zhang | |
| 11,573,395 B2 | 2/2023 | Jung et al. | |
| 2002/0057341 A1* | 5/2002 | Tanaka | H04N 7/181 |
| | | | 348/E7.086 |

(Continued)

FOREIGN PATENT DOCUMENTS

| | | |
|---|---|---|
| CN | 109154712 | 1/2019 |
| CN | 109274877 | 1/2019 |

(Continued)

OTHER PUBLICATIONS

"Office Action of China Counterpart Application", issued on Aug. 26, 2023, with English translation thereof, pp. 1-12.

(Continued)

*Primary Examiner* — Wyatt A Stoffa
*Assistant Examiner* — Mitchell T Oestreich
(74) *Attorney, Agent, or Firm* — JCIPRNET

(57) ABSTRACT

An optical unit includes: a reflective portion that reflects, on a reflective surface, an incident light flux incident from the outside in a reflection direction toward an imaging element from an incident direction; a movable body to which the reflective portion is fixed; and a fixed body. In the movable body, emboss processing is applied to at least one of a reflective surface contact surface in contact with the reflective surface, and a side surface contact surface in contact with a side surface of the reflective portion on a side of an intersecting direction intersecting with the incident direction and the reflection direction.

5 Claims, 16 Drawing Sheets

(56) References Cited

U.S. PATENT DOCUMENTS

2018/0024368 A1*  1/2018  Takagi ............... G02B 27/0176
                                                        359/633
2019/0227300 A1   7/2019  Tsai et al.
2023/0141763 A1   5/2023  Jung et al.

FOREIGN PATENT DOCUMENTS

| CN | 208984869  | 6/2019  |
| CN | 210690922  | 6/2020  |
| CN | 111752066  | 10/2020 |
| WO | 2018035944 | 3/2018  |

OTHER PUBLICATIONS

"Office Action of China Counterpart Application", issued on Mar. 23, 2023, with English translation thereof, pp. 1-11.

\* cited by examiner

OPTICAL UNIT

CROSS REFERENCE TO RELATED APPLICATION

The present invention claims priority under 35 U.S.C. § 119 to Japanese Application No. 2020-195991 filed Nov. 26, 2020, the entire content of which is incorporated herein by reference.

BACKGROUND

Field of the Invention

At least an embodiment of the present invention relates to an optical unit.

Description of the Related Documents

Conventionally, various optical units have been used. Among these, an optical unit is used in which a movable body including a reflective portion that reflects an incident light flux from the outside toward an imaging element is movable with respect to a fixed body. In such an optical unit, the reflective portion is fixed to the movable body in such a way that the reflective portion does not come off the movable body. For example, CN208984869U and US2019/0227300A1 disclose an optical unit in which a slit for injecting an adhesive agent is formed in an area of the movable body where the reflective portion is fixed.

However, in the optical unit having a configuration as disclosed in CN208984869U and US2019/0227300A1, since the slit is shallow, a fixing force of the reflective portion with respect to the movable body is not sufficient, and the reflective portion may come off the movable body. Thus, in the optical unit having the conventional configuration, the reflective portion may come off the movable body.

SUMMARY

An optical unit according to at least an embodiment of the present invention includes, for example, a reflective portion that reflects, on a reflective surface, an incident light flux incident from the outside in a reflection direction toward an imaging element from an incident direction; a movable body to which the reflective portion is fixed; and a fixed body. In the movable body, emboss processing is applied to at least one of a reflective surface contact surface in contact with the reflective surface, and a side surface contact surface in contact with a side surface of the reflective portion on a side of an intersecting direction intersecting with the incident direction and the reflection direction. According to the present aspect, emboss processing is applied to at least one of the reflective surface contact surface and the side surface contact surface. Applying emboss processing significantly increases a frictional force. Thus, it is possible to prevent the reflective portion from coming off the movable body.

An optical unit according to at least an embodiment of the present invention includes, for example, a reflective portion that reflects, on a reflective surface, an incident light flux incident from the outside in a reflection direction toward an imaging element from an incident direction; a movable body to which the reflective portion is fixed; and a fixed body. The movable body includes a step formed by a housing surface of the reflective portion, and at least one of an incident surface that is a surface of the reflective portion on a side of the incident direction, and an exit surface that is a surface of the reflective portion on a side of the reflection direction, and an adhesive reservoir is formed in the step. According to the present aspect, the movable body includes a step serving as an adhesive reservoir formed by the housing surface of the reflective portion, and at least one of the incident surface and the exit surface of the reflective portion. Forming the adhesive reservoir in the step enables forming a large adhesive reservoir. Thus, it is possible to prevent the reflective portion from coming off the movable body.

An optical unit according to at least an embodiment of the present invention includes, for example, a reflective portion that reflects, on a reflective surface, an incident light flux incident from the outside in a reflection direction toward an imaging element from an incident direction; a movable body to which the reflective portion is fixed; and a fixed body. The movable body fixes the reflective portion by thermal caulking on a side surface contact surface in contact with a side surface of the reflective portion on a side of an intersecting direction intersecting with the incident direction and the reflection direction. According to the present aspect, the movable body fixes the reflective portion by thermal caulking on the side surface contact surface. A fixing force between the movable body and the reflective portion is significantly increased by thermal caulking. Thus, it is possible to prevent the reflective portion from coming off the movable body.

An optical unit according to at least an embodiment of the present invention includes, for example, a reflective portion that reflects, on a reflective surface, an incident light flux incident from the outside in a reflection direction toward an imaging element from an incident direction; a movable body to which the reflective portion is fixed; a fixed body; and a fixing member that fixes the movable body and the reflective portion. According to the present aspect, the fixing member is provided to fix the movable body and the reflective portion. Thus, the fixing member can advantageously prevent the reflective portion from coming off the movable body.

In an optical unit according to at least an embodiment of the present invention, the fixing member may come into planar contact with at least one of an incident surface that is a surface of the reflective portion on a side of the incident direction, and an exit surface that is a surface of the reflective portion on a side of the reflection direction by abutment. In this configuration, the reflective portion can be easily and appropriately positioned with respect to the movable body, and it is possible to particularly improve adhesive strength by applying an adhesive agent to a portion in planar contact, and the like, whereby it is possible to advantageously prevent the reflective portion from coming off the movable body.

In an optical unit according to at least an embodiment of the present invention, the fixing member may be a plate spring that is fixed to the reflective portion by holding the reflective portion between both side surfaces of the reflective portion on a side of an intersecting direction intersecting with the incident direction and the reflection direction, the fixing member being fixed to the movable body. In this configuration, it is possible to particularly advantageously prevent the reflective portion from coming off the movable body with a simple configuration in which the reflective portion is held by the plate spring and fixed to the movable body altogether with the plate spring.

In an optical unit according to at least an embodiment of the present invention, the movable body may include a reflective surface contact surface in contact with the reflective surface, and the fixing member may come into contact with, at a position facing the reflective surface contact surface, a part of an incident surface that is a surface of the reflective portion on a side of the incident direction, and a part of an exit surface that is a surface of the reflective portion on a side of the reflection direction. In this configuration, it is possible to advantageously prevent the reflective portion from coming off in a direction opposite to the reflective surface contact surface, and it is possible to particularly advantageously prevent the reflective portion from coming off the movable body.

In an optical unit according to at least an embodiment of the present invention, the fixing member may include a reflective surface support portion that supports the reflective surface, and a holding portion that holds the reflective portion between both side surfaces of the reflective portion on a side of an intersecting direction intersecting with the incident direction and the reflection direction, the movable body may include a reflective surface support portion contact surface in contact with the reflective surface support portion, and a slit may be formed in a surface of the reflective surface support portion in contact with the reflective surface support portion contact surface. In this configuration, it becomes possible to firmly fix the fixing member to the movable body by the slit, and it is possible to particularly advantageously prevent the reflective portion from coming off the movable body.

In an optical unit according to at least an embodiment of the present invention, the holding portion may include, at a position facing the reflective surface support portion, a regulation portion in contact with a part of an incident surface that is a surface of the reflective portion on a side of the incident direction, and a part of an exit surface that is a surface of the reflective portion on a side of the reflection direction. In this configuration, it is possible to advantageously prevent the reflective portion from coming off in a direction opposite to the reflective surface contact surface by the regulation portion, and it is possible to particularly advantageously prevent the reflective portion from coming off the movable body.

An optical unit according to at least an embodiment of the present invention includes, for example, a reflective portion that reflects, on a reflective surface, an incident light flux incident from the outside in a reflection direction toward an imaging element from an incident direction; a movable body to which the reflective portion is fixed; and a fixed body. The movable body has a plurality of slits in a reflective surface contact surface in contact with the reflective surface, and an average depth of the slits is greater than an average width of the slits. According to the present aspect, the movable body has a plurality of slits in the reflective surface contact surface, and the average depth of the slits is greater than the average width of the slits. When the slits are shallow, an adhesive force of an adhesive agent may not be fully utilized. However, forming the slits deeply enables to acquire a large adhesive force. Thus, it is possible to prevent the reflective portion from coming off the movable body.

In an optical unit according to at least an embodiment of the present invention, the plurality of slits may be aligned in a depth direction. In this configuration, it is possible to form a large number of slits, and it is possible to advantageously prevent the reflective portion from coming off the movable body.

In an optical unit according to at least an embodiment of the present invention, each of the plurality of slits may penetrate in a depth direction. In this configuration, it becomes easy to introduce an adhesive agent into the slits.

An optical unit according to at least an embodiment of the present invention enables preventing a reflective portion from coming off a movable body to which the reflective portion is fixed.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

In the following, embodiments according to the present invention are described based on the drawings. Note that, in each of the drawings, an X-axis, a Y-axis, and a Z-axis are directions orthogonal to one another, and drawings viewed from the +X direction and the −X direction are side views, a drawing viewed from the +Y direction is a plan view, a drawing viewed from the −Y direction is a bottom view, a drawing viewed from the +Z direction is a rear view, and a drawing viewed from the −Z direction is a front view. The +Y direction is equivalent to an incident direction D1 of a light flux from the outside.

Embodiment 1

First, an optical unit 1 according to Embodiment 1 is described.

Outline of Device Including Optical Unit

Figure 1:
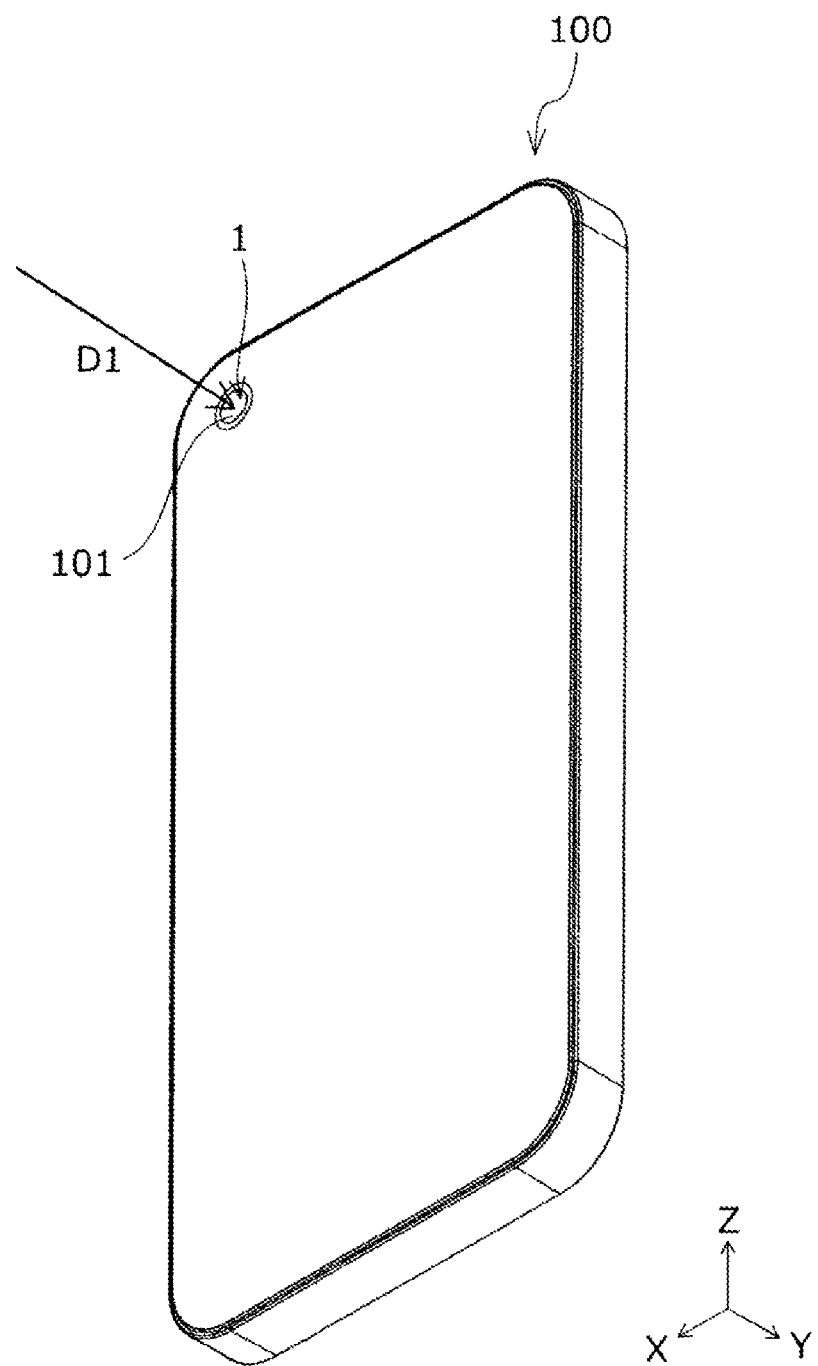
FIG. 1 is a perspective view of a smartphone including an optical unit according to Embodiment 1 of the present invention.

FIG. 1 is a schematic perspective view of a smartphone 100 as an example of a device including the optical unit 1 according to Embodiment 1. The optical unit 1 according to the present embodiment can be preferably used in the smartphone 100. This is because the optical unit 1 according to the present embodiment can be made thin, and a thickness of the smartphone 100 in the Y-axis direction can be made thin. However, the optical unit 1 according to the present embodiment is not exclusively used for the smartphone 100, but can be used in various devices such as cameras and videos without any particular limitation.

As shown in FIG. 1, the smartphone 100 includes a lens 101 through which a light flux is incident. The optical unit 1 is provided inside the lens 101 of the smartphone 100. The smartphone 100 is able to receive a light flux from the outside in the incident direction D1 through the lens 101, and capture an image of a subject, based on the incident light flux.

Overall Configuration of Optical Unit

Figure 2:
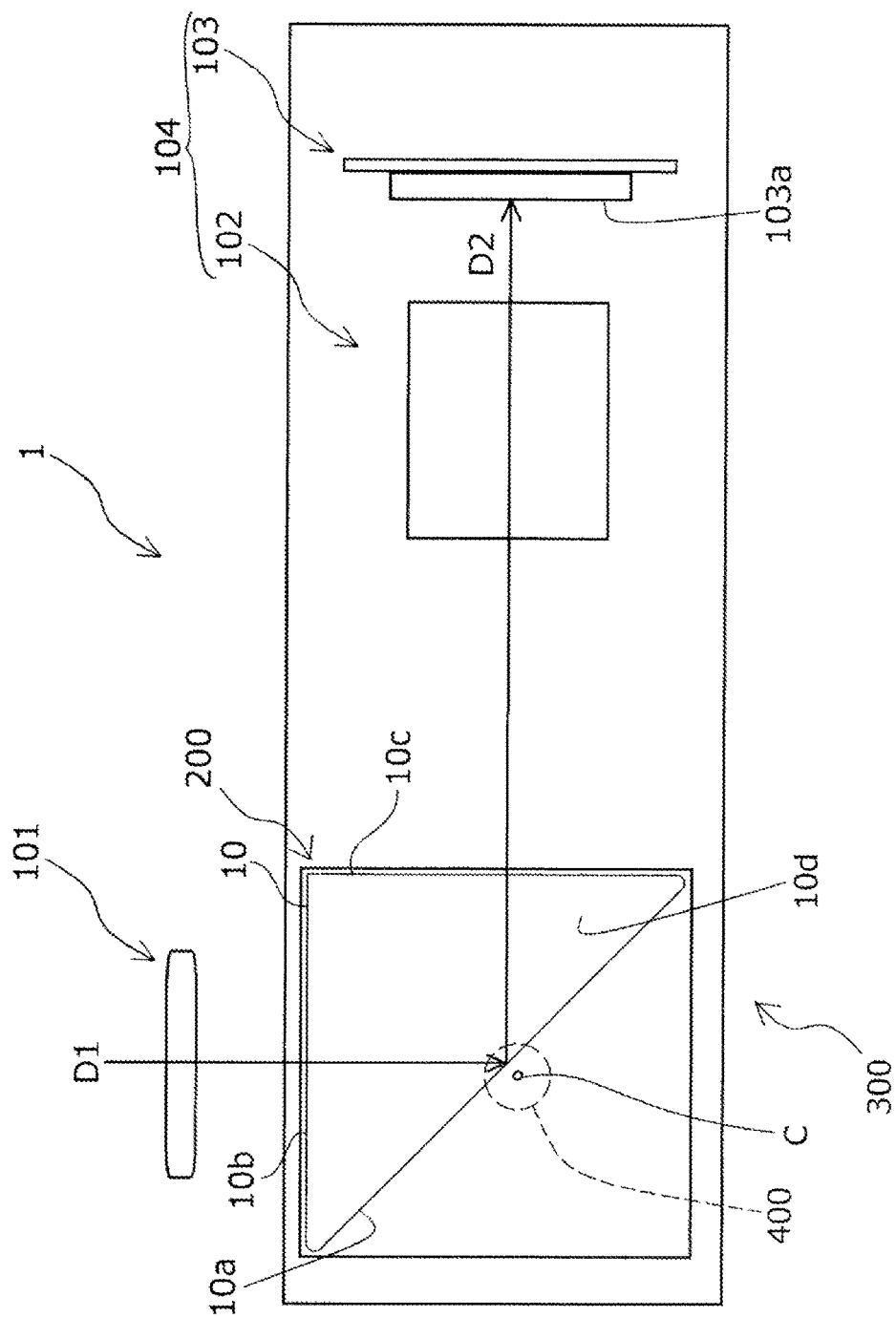
FIG. 2 is a schematic side view of the optical unit according to Embodiment 1 of the present invention.

FIG. 2 is a side view schematically showing the optical unit 1 according to the present embodiment. As shown in FIG. 2, the optical unit 1 according to the present embodiment includes a fixed body 300, a reflection unit 200 as a movable body having a prism 10 as a reflective portion, and a camera 104 having a substrate 103 on which an imaging element 103a is mounted and a lens 102. The reflection unit 200 receives, on an incident surface 10b, a light flux from the outside in the incident direction D1 through the lens 101, reflects the incident light flux on a reflective surface 10a of the prism 10, and outputs the incident light flux in a reflection direction D2 toward the imaging element 103a from an exit surface 10c. Although the reflection unit 200 according to the present embodiment includes the prism 10 as the reflective portion, a configuration of the reflective portion is not limited to the prism 10, and a mirror or the like may be provided as the reflective portion. The incident direction D1 is a direction along the Y-axis direction. Although the reflection direction D2 is generally along the Z-axis direction, the reflection direction D2 changes by displacement of the prism 10.

The optical unit 1 according to the present embodiment includes a rotation support mechanism 400 that rotates the reflection unit 200 with respect to the fixed body 300 in a direction (X-axis direction) intersecting with the incident direction D1 and the reflection direction D2, as a rotation axis C. However, the embodiment is not limited to such a configuration, and a configuration in which the reflection unit 200 rotates with respect to the fixed body 300 in a direction other than the X-axis direction as the rotation axis, or a configuration in which the reflection unit 200 is movable with respect to the fixed body 300 in a manner other than rotation may be provided.

Configuration of Reflection Unit

Figure 3:
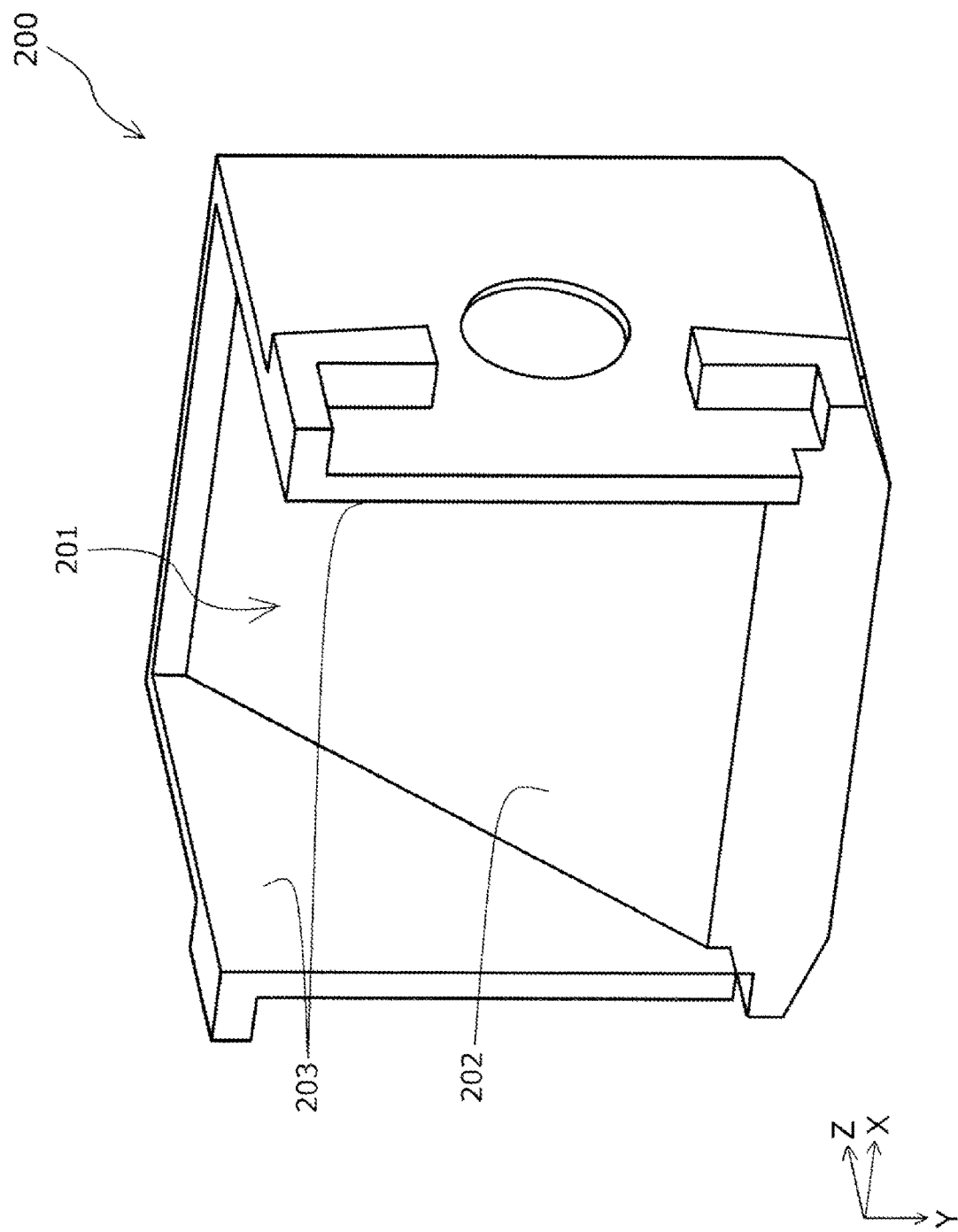
FIG. 3 is a schematic perspective view of a reflection unit of the optical unit according to Embodiment 1 of the present invention, showing a state in which a prism is removed.

FIG. 3 is a perspective view of the reflection unit 200 the optical unit 1 according to the present embodiment. The reflection unit 200 of the optical unit 1 according to the present embodiment includes a fixing portion 201 of the prism 10. The fixing portion 201 includes a reflective surface contact surface 202 in contact with the reflective surface 10a of the prism 10, and a side surface contact surface 203 in contact with a side surface 10d (see FIG. 2) of the prism 10 on a side of an intersecting direction (side in the X axis direction) intersecting with the incident direction D1 and the reflection direction D2. Emboss processing is applied to the reflective surface contact surface 202 and the side surface contact surface 203. In the present specification, "contact" includes, in addition to direct contact, indirect contact via another member.

As described above, the optical unit 1 according to the present embodiment includes: the prism 10 that reflects, on the reflective surface 10a, an incident light flux incident from the outside in a reflection direction toward the imaging element 103a from the incident direction D1; the reflection unit 200 to which the prism 10 is fixed; and the fixed body 300. In an optical unit having such a configuration, as in the optical unit 1 according to the present embodiment, it is preferable that emboss processing is applied to at least one of the reflective surface contact surface 202 and the side surface contact surface 203 of the reflection unit 200. This is because applying emboss processing significantly increases a frictional force, and it is possible to prevent the prism 10 from coming off the reflection unit 200.

Applying an adhesive agent to the reflective surface contact surface 202 and the side surface contact surface 203 which have undergone emboss processing particularly and significantly increases a frictional force, and enables advantageously preventing the prism 10 from coming off the reflection unit 200 to which the prism 10 is fixed. For this reason, it is particularly preferable to apply an adhesive agent to the reflective surface contact surface 202 and the side surface contact surface 203. However, an adhesive agent may not be applied to the reflective surface contact surface 202 and the side surface contact surface 203.

Embodiment 2

Figure 4:
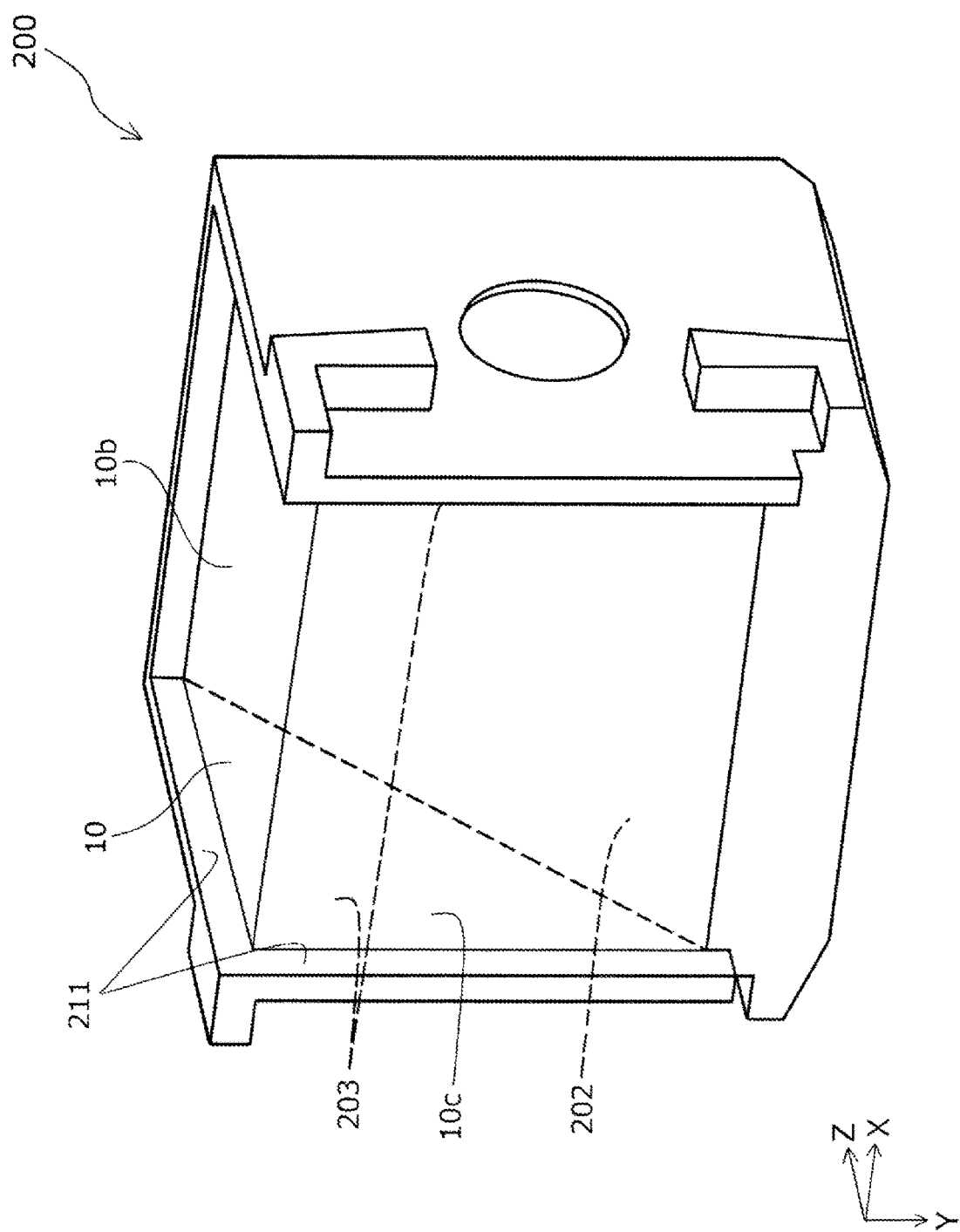
FIG. 4 is a schematic perspective view of a reflection unit of an optical unit according to Embodiment 2 of the present invention.

Next, an optical unit 1 according to Embodiment 2 is described with reference to FIG. 4. Herein, FIG. 4 is a perspective view of a reflection unit 200 of the optical unit 1 according to Embodiment 2 of the present invention. Note that, components common to those of Embodiment 1 are indicated by the same reference signs, and detailed description thereof is omitted. The optical unit 1 according to the present embodiment has a similar configuration to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIG. 4, in the reflection unit 200 according to the present embodiment, a side surface contact surface 203 is larger than a side surface 10d of a prism 10 in the −Y direction and the −Z direction. In other words, in the reflection unit 200 according to the present embodiment, a step 211 is formed with respect to an incident surface 10b that is a surface of the prism 10 on a side of an incident direction D1, and an exit surface 10c that is a surface of the prism 10 on a side of a reflection direction. Then, an area associated with the step 211 serves as an adhesive reservoir.

Herein, the adhesive reservoir is an area capable of storing an adhesive agent, and forming the adhesive reservoir improves an adhesive force.

As in the optical unit 1 according to the present embodiment, the step 211 is formed by the side surface contact surface 203 as a housing surface of the prism 10 in the reflection unit 200, and at least one of the incident surface 10b of the prism 10 and the exit surface 10c of the prism 10, and an adhesive reservoir is formed in the step 211, whereby a large adhesive reservoir can be formed. By forming the large adhesive reservoir, the prism 10 can be firmly fixed to the reflection unit 200. Therefore, as in the optical unit 1 according to the present embodiment, by forming the step 211 serving as the adhesive reservoir, it is possible to prevent the prism 10 from coming off the reflection unit 200.

Embodiment 3

Figure 5:
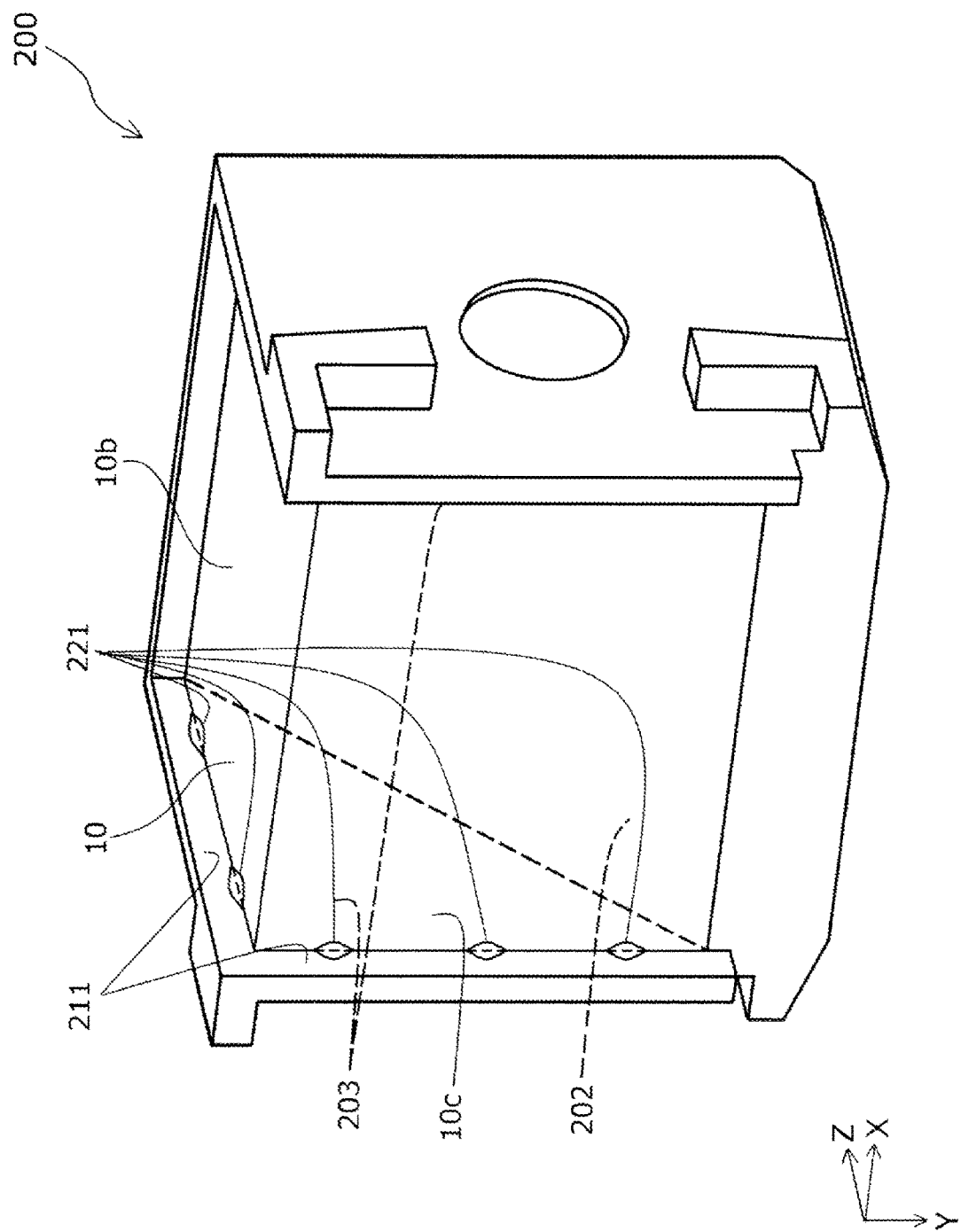
FIG. 5 is a schematic perspective view of a reflection unit of an optical unit according to Embodiment 3 of the present invention.

Next, an optical unit 1 according to Embodiment 3 is described with reference to FIG. 5. Herein, FIG. 5 is a perspective view of a reflection unit 200 of the optical unit 1 according to Embodiment 3 of the present invention. Note that, components common to those of Embodiments 1 and 2 are indicated by the same reference signs, and detailed description thereof is omitted. The optical unit 1 according to the present embodiment has a similar configuration to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIG. 5, in the reflection unit 200 according to the present embodiment, a plurality of fixing portions 221 are formed on a side surface contact surface 203 by thermally caulking convex portions formed on the side surface contact surface 203. In other words, in the optical unit 1 according to the present embodiment, the reflection unit 200 fixes the prism 10 on the side surface contact surface 203 by thermal caulking. Thermally caulking the prism 10 on the side surface contact surface 203 significantly increases a fixing force between the reflection unit 200 and the prism 10. Thus, the optical unit 1 according to the present embodiment can advantageously prevent the prism 10 from coming off the reflection unit 200. Note that, in the present embodiment, a plurality of protrusions are formed on the side surface contact surface 203, and the prism 10 is thermally caulked by heating and deforming the protrusions after the prism 10 is supported by the reflection unit 200. Therefore, the plurality of fixing portions 221 are locally formed. However, the embodiment is not limited to such a configuration, and the fixing portions 221 may be integrally formed over the entire circumference. Although FIG. 5 shows only the fixing portion 221 on the side surface contact surface 203 on the −X direction side, the fixing portions 221 are also formed on the side surface contact surface 203 on the +X direction side.

Embodiment 4

Figure 6:
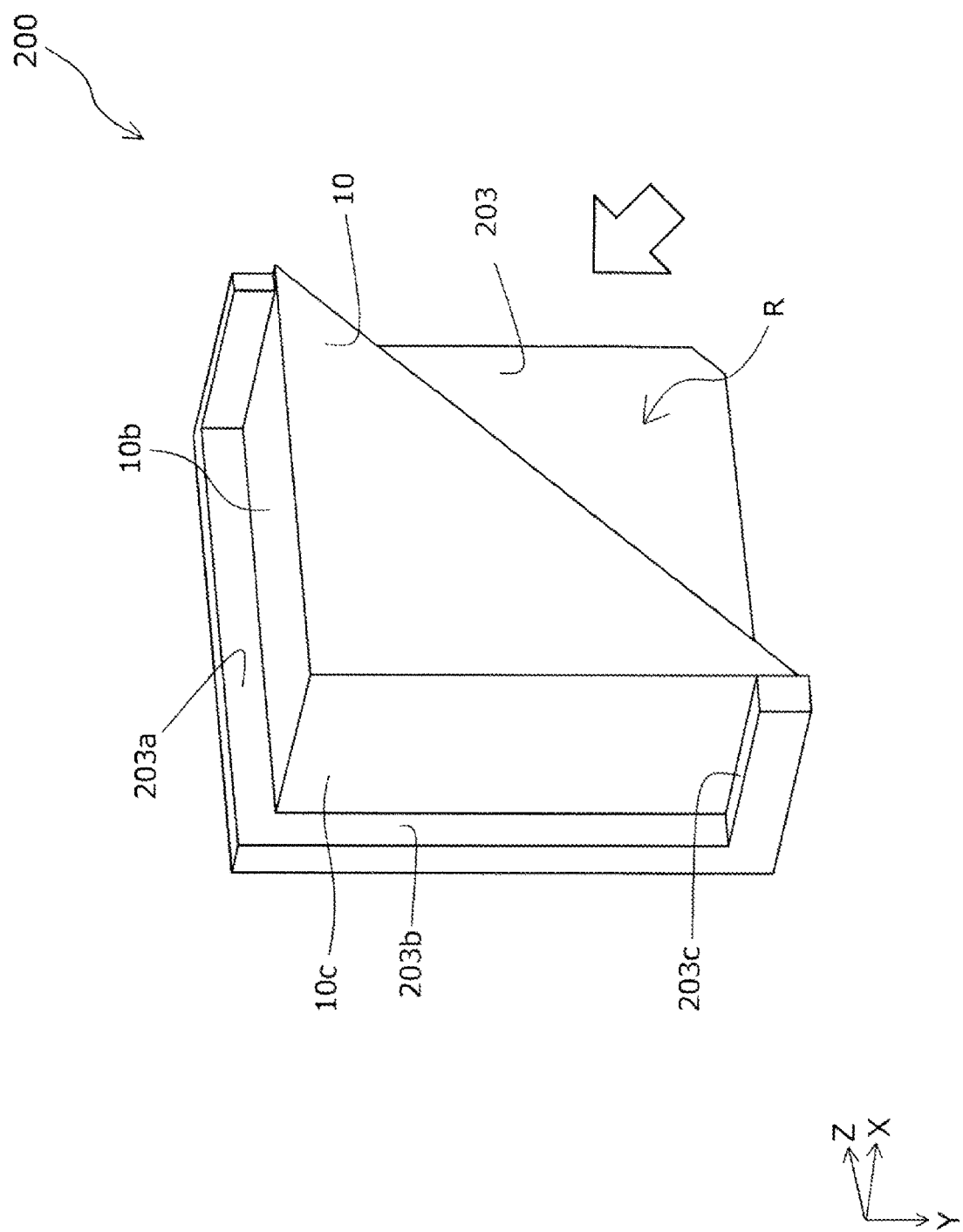
FIG. 6 is a schematic cross-sectional perspective view of a reflection unit of an optical unit according to Embodiment 4 of the present invention.

Next, an optical unit 1 according to Embodiment 4 is described with reference to FIG. 6. Herein, FIG. 6 is a cross-sectional perspective view of a reflection unit 200 of the optical unit 1 according to Embodiment 4 of the present invention. Note that, components common to those of Embodiments 1 to 3 are indicated by the same reference signs, and detailed description thereof is omitted. The optical unit 1 according to the present embodiment has a similar configuration to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIG. 6, in the reflection unit 200 according to the present embodiment, an area facing a reflective surface 10a of a prism 10 is an open space R, and the prism 10 can be inserted in the arrow direction from a side of the open space R. The reflection unit 200 according to the present embodiment includes a first rib 203a that regulates the prism 10 inserted from the side of the open space R by abutment against an incident surface 10b, and a second rib 203b and a third rib 203c that regulate the prism 10 inserted from the side of the open space R by abutment against an exit surface 10c. Then, an adhesive agent is applied between the incident surface 10b and the first rib 203a, and an adhesive agent is applied between the exit surface 10c, and the second rib 203b and the third rib 203c, whereby the prism 10 is fixed to the reflection unit 200.

In this way, the reflection unit 200 according to the present embodiment includes the first rib 203a, the second rib 203b, and the third rib 203c as fixing members that fix the reflection unit 200 and the prism 10. Therefore, the first rib 203a, the second rib 203b, and the third rib 203c as the fixing members advantageously prevent the prism 10 from coming off the reflection unit 200. Note that, in the reflection unit 200 according to the present embodiment, the first rib 203a, the second rib 203b, and the third rib 203c as the fixing members are integrally formed with a side surface contact surface 203. However, the fixing member may be integrally formed with a component of the reflection unit 200, or may be formed as a separate member.

Note that, the fixing member is only needed to come into planar contact with at least one of the incident surface 10b of the prism 10 and the exit surface 10c of the prism 10 by abutment. In such a configuration, the prism 10 can be easily and appropriately positioned with respect to the reflection unit 200, and it is possible to particularly improve an adhesive force by applying an adhesive agent to a portion in planar contact, and the like, whereby it is possible to advantageously prevent the prism 10 from coming off from the reflection unit 200.

Embodiment 5

Figure 7:
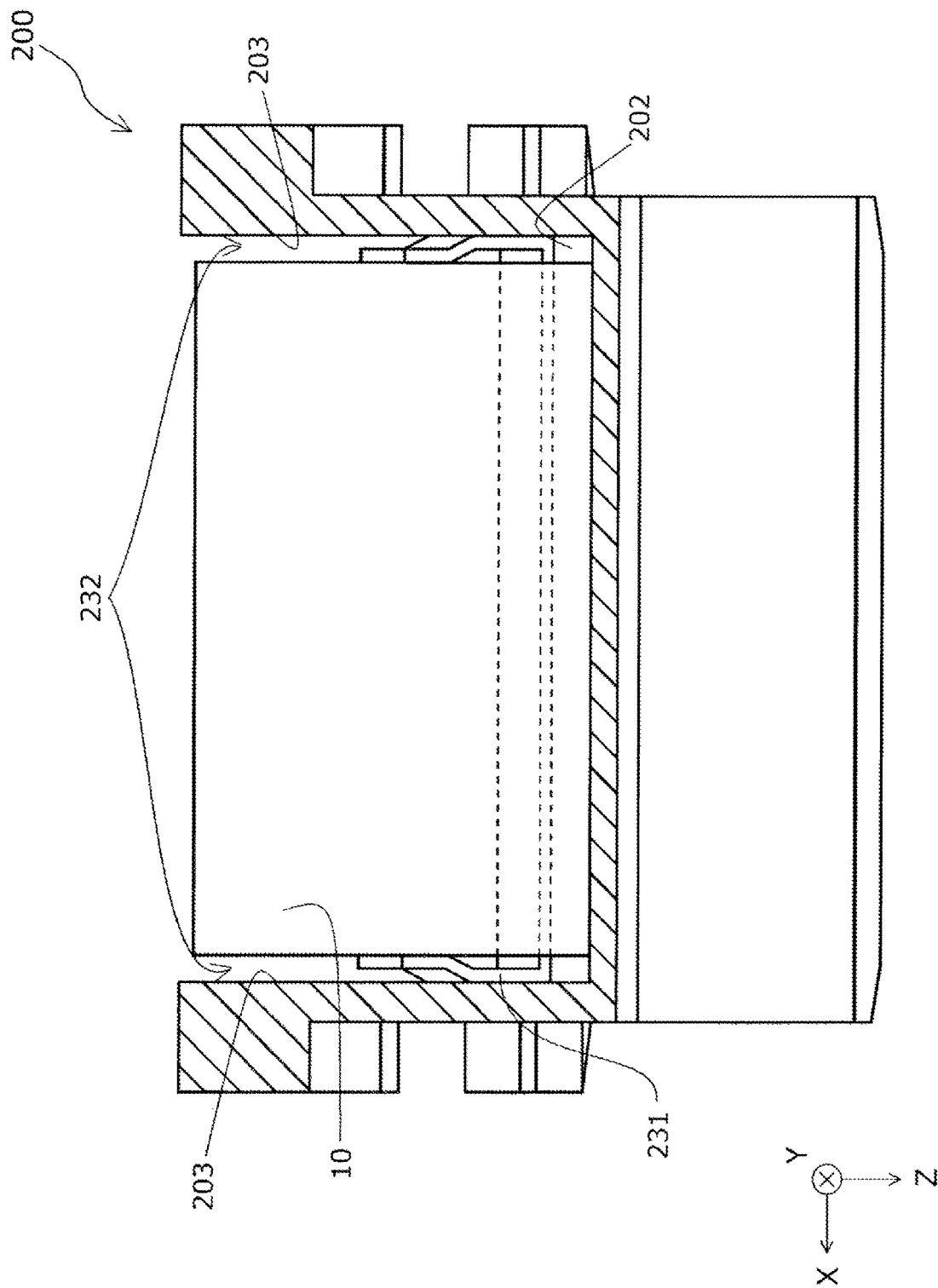
FIG. 7 is a schematic cross-sectional plan view of a reflection unit of an optical unit according to Embodiment 5 of the present invention.
Figure 8:
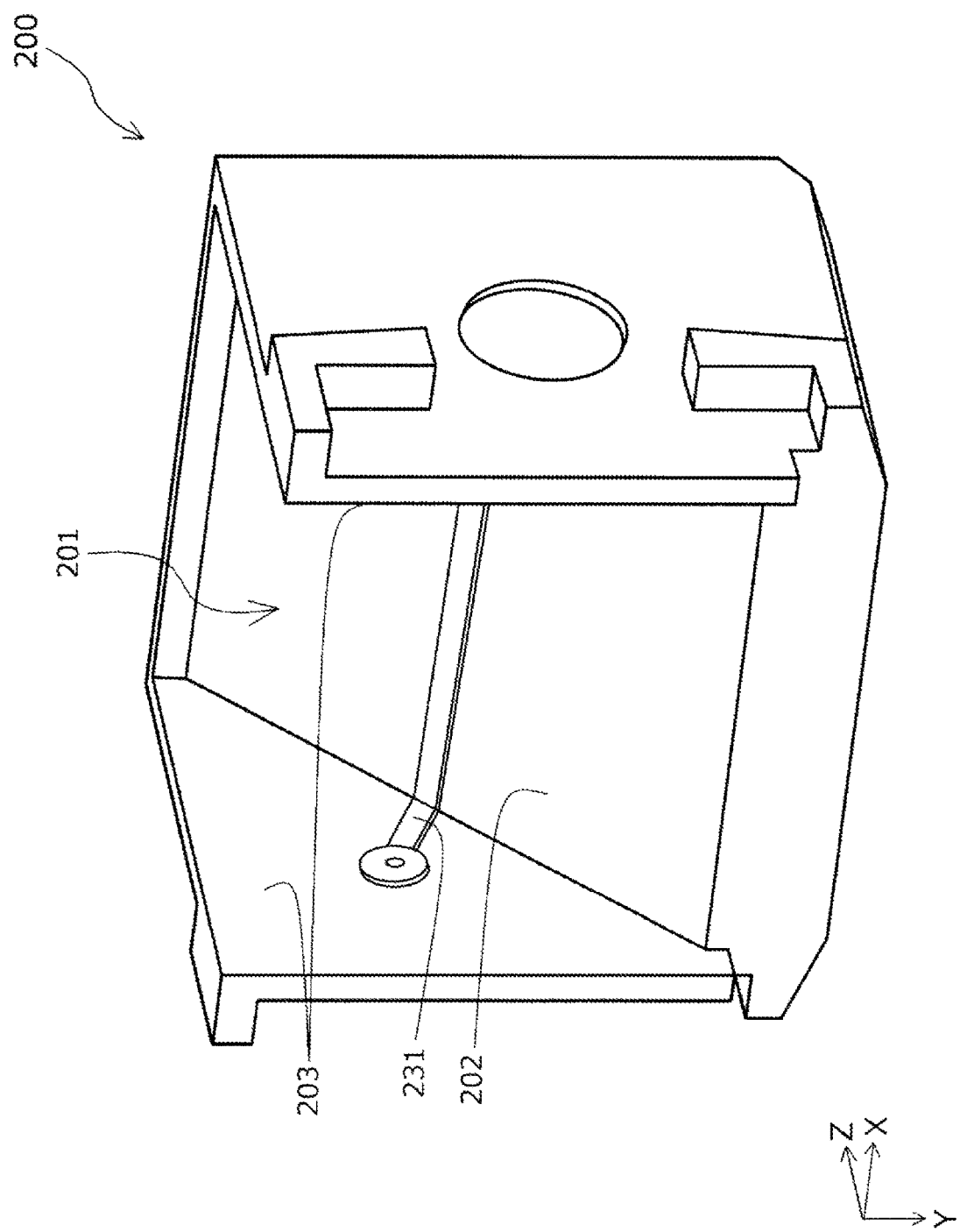
FIG. 8 is a schematic perspective view of a reflection unit of the optical unit according to Embodiment 5 of the present invention.

Next, an optical unit 1 according to Embodiment 5 is described with reference to FIGS. 7 and 8. Herein, FIG. 7 is a cross-sectional plan view of a reflection unit 200 of the optical unit 1 according to Embodiment 5 of the present invention. FIG. 8 is a perspective view of the reflection unit 200 of the optical unit 1 according to Embodiment 5 of the present invention. Note that, components common to those of Embodiments 1 to 4 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIGS. 7 and 8, in the reflection unit 200 according to the present embodiment, a plate spring 231 is provided as a fixing member that fixes the reflection unit 200 and a prism 10. More specifically, the fixing member of the reflection unit 200 according to the present embodiment is the plate spring 231 that is fixed to the prism 10 by holding the prism 10 between both side surfaces 10d of the prism 10 on a side of an intersecting direction (side in the X-axis direction) intersecting with an incident direction D1 and a reflection direction D2, and is also fixed to the reflection unit 200. By using a fixing member having such a configuration, it is possible to particularly advantageously prevent the prism 10 from coming off the reflection unit 200 with a simple configuration in which the prism 10 is held by the plate spring 231, and the prism 10 is fixed to the reflection unit 200 altogether with the plate spring 231. Note that, injecting an adhesive into a gap 232 between the reflection unit 200 and the prism 10 in FIG. 7 can further advantageously prevent the prism 10 from coming off the reflection unit 200.

Embodiment 6

Figure 9:
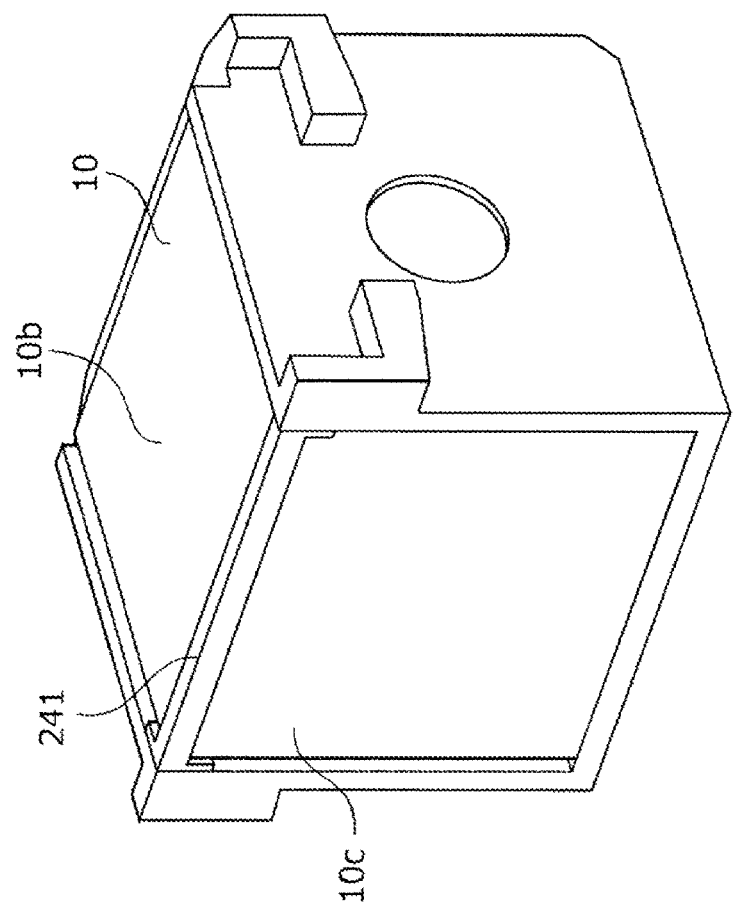
FIG. 9 is a schematic perspective view of a reflection unit of an optical unit according to Embodiment 6 of the present invention.

Next, an optical unit 1 according to Embodiment 6 is described with reference to FIG. 9. Herein, FIG. 9 is a perspective view of a reflection unit 200 of the optical unit 1 according to Embodiment 6 of the present invention. Note that, components common to those of Embodiments 1 to 5 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIG. 9, in the reflection unit 200 according to the present embodiment, a regulation member 241 extending in the X-axis direction is provided as a fixing member that fixes the reflection unit 200 and a prism 10. More specifically, as the fixing member, there is provided, at a position facing a reflective surface contact surface 202, the regulation member 241 in contact with a part of an incident surface 10b of the prism 10 and a part of an exit surface 10c of the prism 10. In the optical unit 1 according to the present embodiment having such a configuration, it is possible to advantageously prevent the prism 10 from coming off in a direction opposite to the reflective surface contact surface 202, and it is possible to particularly advantageously prevent the prism 10 from coming off the reflection unit 200. Note that, the regulation member 241 is configured to come into contact only with a part of the incident surface 10b of the prism 10 and a part of the exit surface 10c of the prism 10 so as not to interfere with incidence of an incident light flux onto the prism 10 and output of the incident light flux from the prism 10.

Embodiment 7

Figure 10:
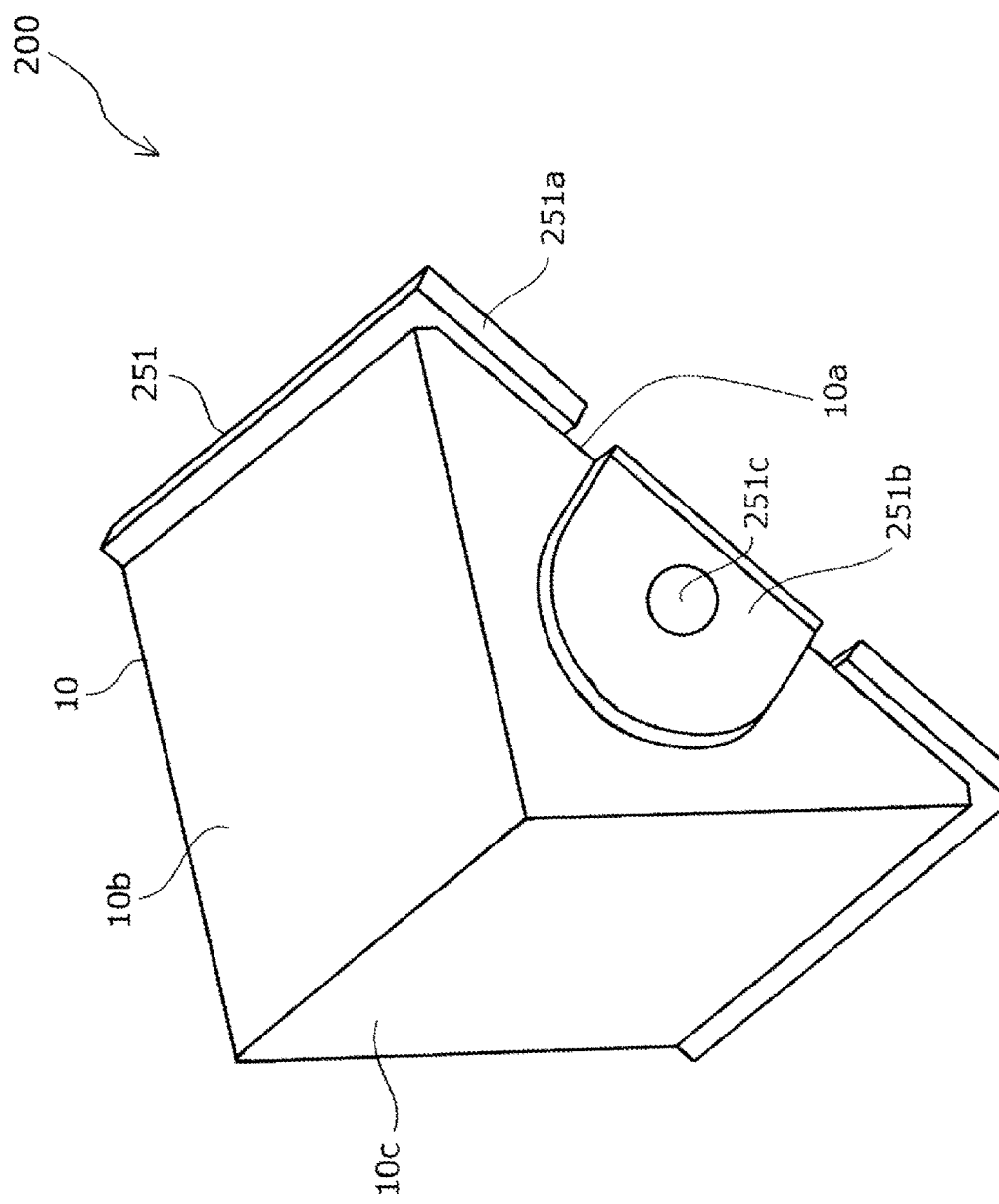
FIG. 10 is a schematic perspective view of a prism and a fixing member of an optical unit according to Embodiment 7 of the present invention.
Figure 11:
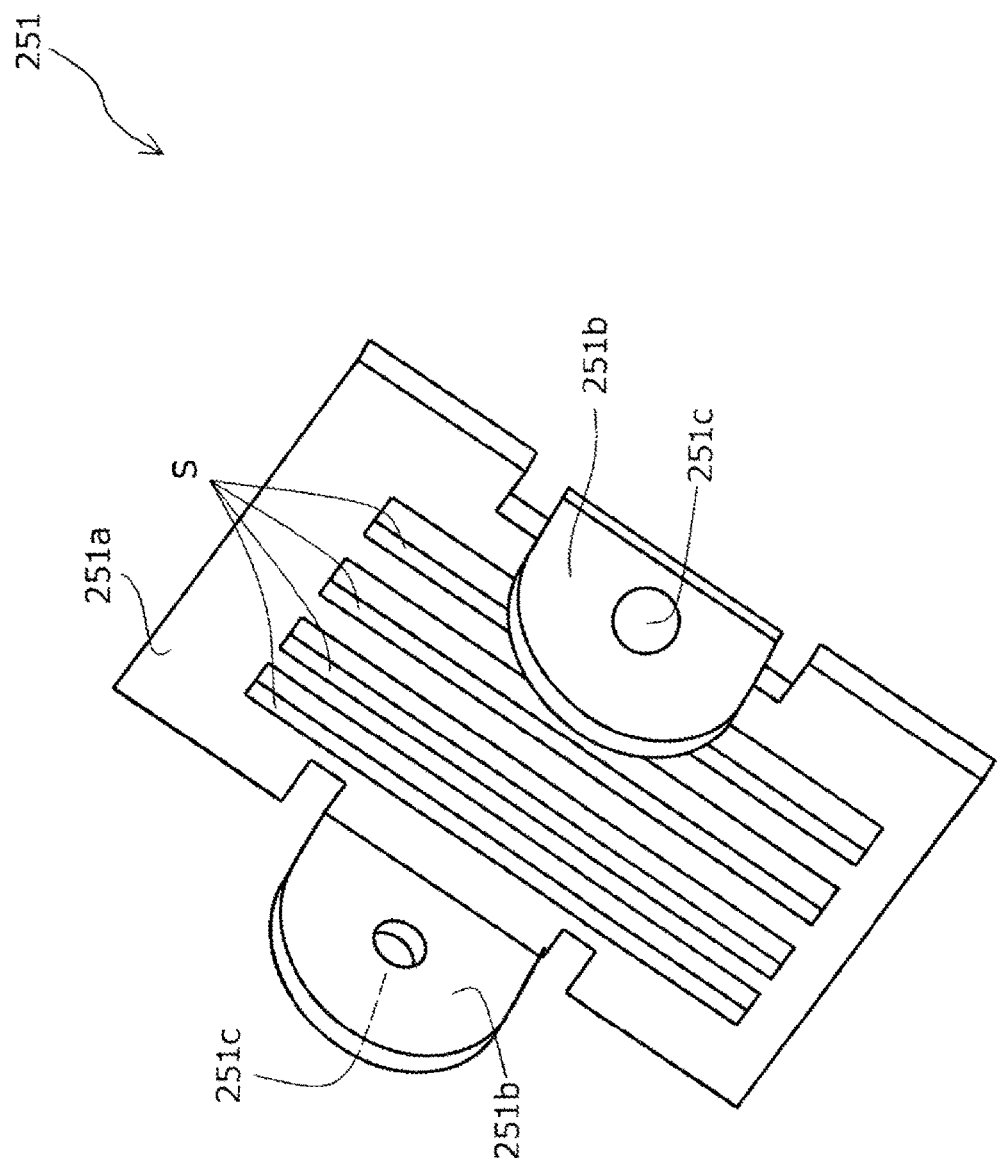
FIG. 11 is a schematic perspective view of a fixing member of the optical unit according to Embodiment 7 of the present invention.

Next, an optical unit 1 according to Embodiment 7 is described with reference to FIGS. 10 and 11. Herein, FIG. 10 is a perspective view of a prism 10 and a fixing member 251 of the optical unit 1 according to Embodiment 7 of the present invention. FIG. 11 is a perspective view of the fixing member 251 of the optical unit 1 according to Embodiment 7 of the present invention. Note that, components common to those of Embodiments 1 to 6 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIGS. 10 and 11, in a reflection unit 200 according to the present embodiment, the fixing member 251 is provided to fix the reflection unit 200 and the prism 10. More specifically, the fixing member 251 has a reflective surface support portion 251a that supports a reflective surface 10a of the prism 10, and a holding portion 251b that holds the prism 10 between both side surfaces 10d of the prism 10 on a side of the X-axis direction. Herein, a reflective surface contact surface 202 has a role as a reflective surface support portion contact surface in contact with the reflective surface support portion 251a, and as shown in FIG. 11, a slit S is formed in a surface of the reflective surface support portion 251a in contact with the reflective surface support portion contact surface. In this configuration, it becomes possible to firmly adhere the fixing member to a movable body by the slit, and it is possible to particularly advantageously prevent a reflective portion from coming off the movable body to which the reflective portion is fixed. In the optical unit 1 according to the present embodiment having such a configuration, the slit S allows the fixing member 251 to be firmly adhered to the reflection unit 200, and it is possible to particularly advantageously prevent the prism 10 from coming off the reflection unit 200.

In addition, in the fixing member 251 according to the present embodiment, a convex portion 251c is formed on the holding portion 251b. Engagement of the convex portion 251c in an unillustrated concave portion (engagement portion) formed in a side surface contact surface 203 further advantageously prevents the prism 10 from coming off the reflection unit 200.

Embodiment 8

Figure 12:
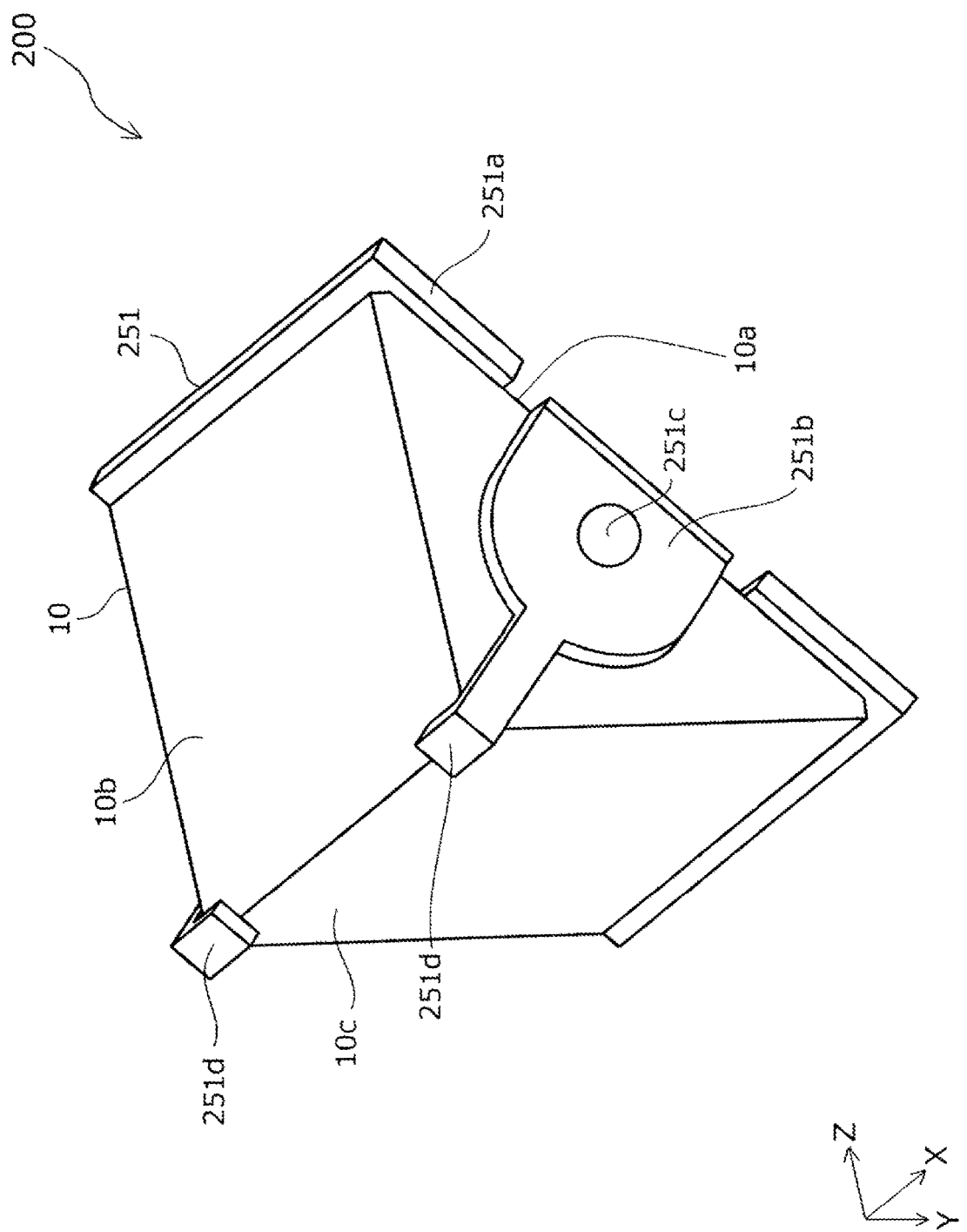
FIG. 12 is a schematic perspective view of a prism and a fixing member of an optical unit according to Embodiment 8 of the present invention.

Next, an optical unit 1 according to Embodiment 8 is described with reference to FIG. 12. Herein, FIG. 12 is a perspective view of a prism 10 and a fixing member 251 of the optical unit 1 according to Embodiment 8 of the present invention. Note that, components common to those of Embodiments 1 to 7 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIG. 12, in the fixing member 251 according to the present embodiment, a regulation portion 251d is formed on both of two holding portions 251b to press a boundary portion between an incident surface 10b and an exit surface 10c of the prism 10. The optical unit 1 according to the present embodiment has a configuration similar to the configuration of the optical unit 1 according to Embodiment 7 except that the regulation portion 251d is formed on both of the two holding portions 251b.

Embodiment 9

Figure 13:
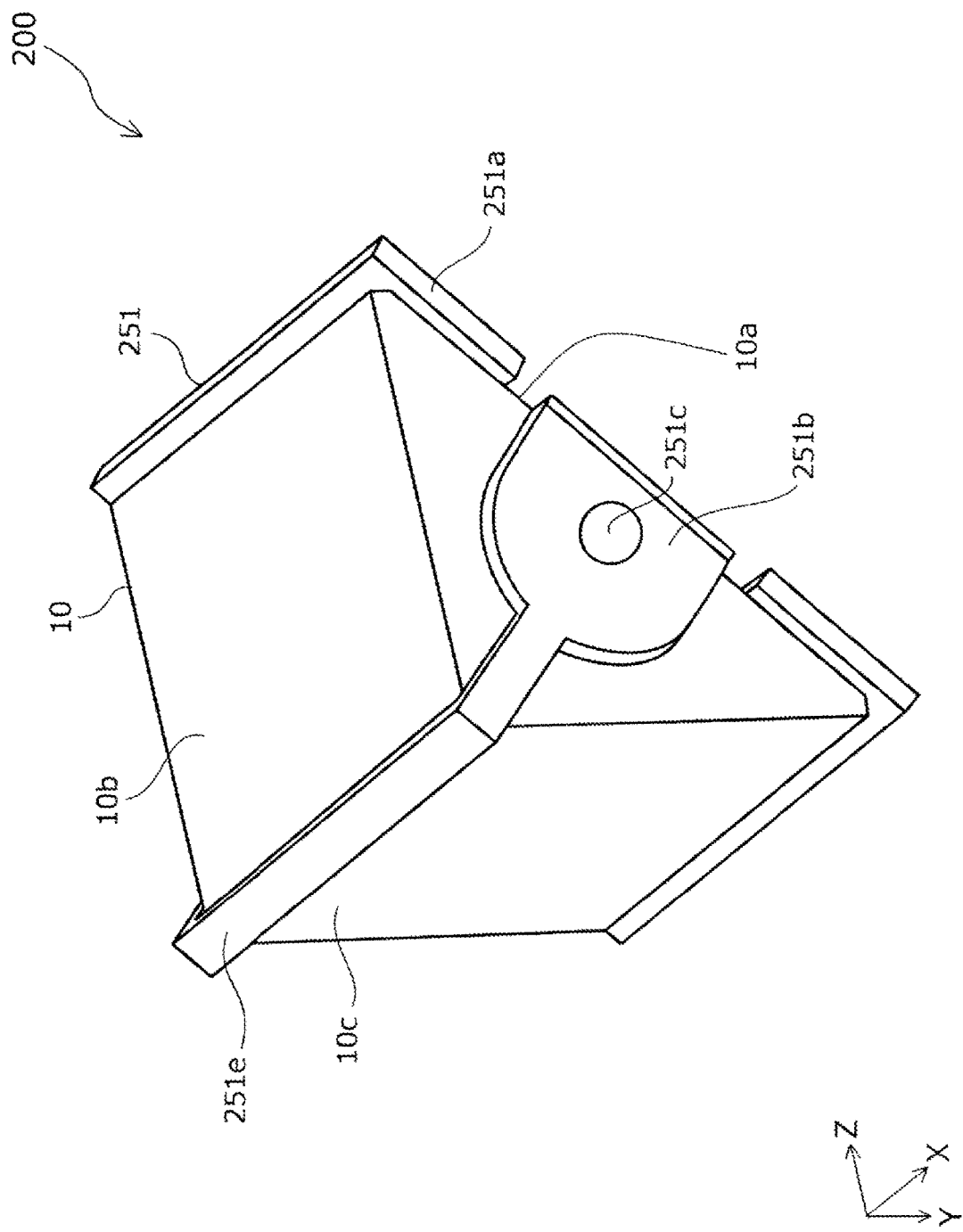
FIG. 13 is a schematic perspective view of a prism and a fixing member of an optical unit according to Embodiment 9 of the present invention.

Next, an optical unit 1 according to Embodiment 9 is described with reference to FIG. 13. Herein, FIG. 13 is a perspective view of a prism 10 and a fixing member 251 of the optical unit 1 according to Embodiment 9 of the present invention. Note that, components common to those of Embodiments 1 to 8 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIG. 13, the fixing member 251 according to the present embodiment is provided with a regulation portion 251e connected to both of two holding portions 251b and configured to press a boundary portion between an incident surface 10b and an exit surface 10c of the prism 10. The optical unit 1 according to the present embodiment has a configuration similar to the configuration of the optical unit 1 according to Embodiment 7 except that the regulation portion 251e connected to both of the two holding portions 251b is provided.

Herein, in the optical unit 1 according to Embodiment 8 and the optical unit 1 according to the present embodiment, a regulation portion (the regulation portion 251d or the regulation portion 251e) in contact with a part of the incident surface 10b of the prism 10 and a part of the exit surface 10c of the prism 10 is formed on the holding portion 251b at a position facing the reflective surface support portion 251a. In the optical unit 1 according to Embodiment 8 and the optical unit 1 according to the present embodiment having such a configuration, it is possible to advantageously prevent the prism 10 from coming off in a direction opposite to the reflective surface contact surface 202 by the regulation portion and it is possible to particularly advantageously prevent the prism 10 from coming off the reflection unit 200.

Embodiment 10

Figure 14:
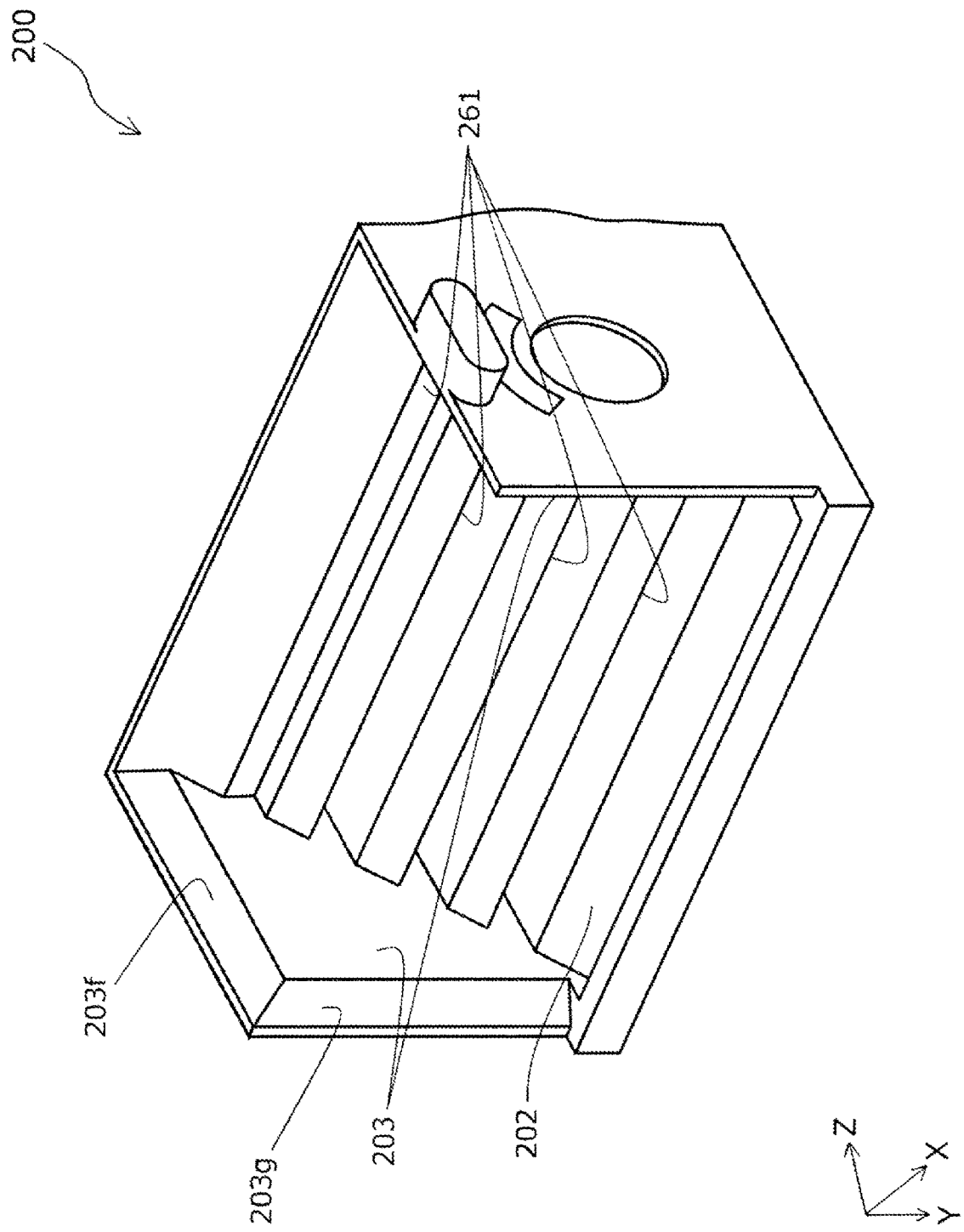
FIG. 14 is a schematic perspective view of a reflection unit of an optical unit according to Embodiment 10 of the present invention, showing a state in which a prism is removed.
Figure 15:
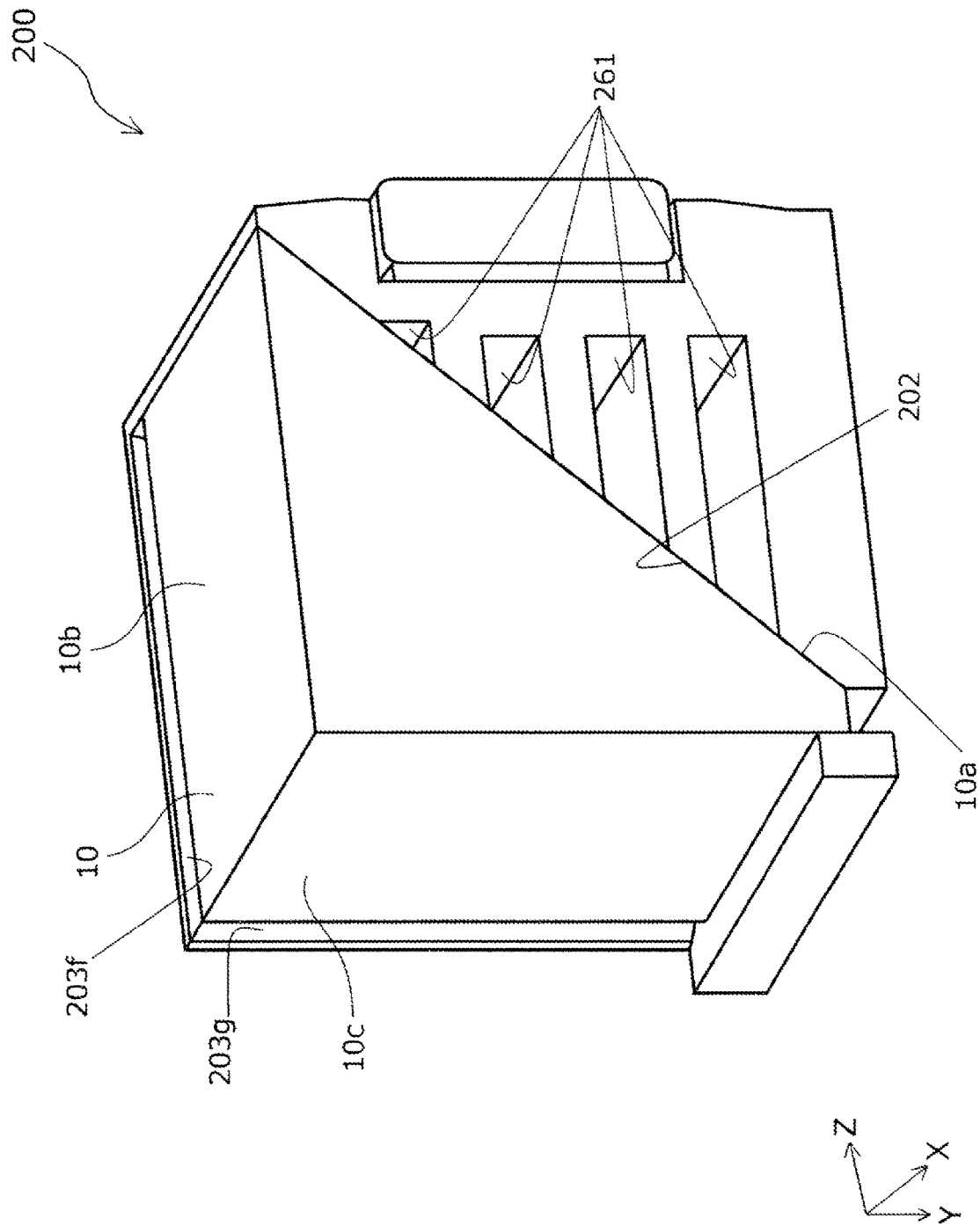
FIG. 15 is a schematic cross-sectional perspective view of a reflection unit of the optical unit according to Embodiment 10 of the present invention.

Next, an optical unit 1 according to Embodiment 10 is described with reference to FIGS. 14 and 15. Herein, FIGS. 14 and 15 are perspective views of a reflection unit 200 of the optical unit 1 according to Embodiment 10 of the present invention. FIG. 14 is a state diagram in which a prism 10 is removed, and FIG. 15 is a state diagram in which the prism 10 is installed. Note that, components common to those of Embodiments 1 to 9 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIGS. 14 and 15, the reflection unit 200 according to the present embodiment is formed with, in a reflective surface contact surface 202, a plurality of slits 261 along the X-axis direction extending deeply in the +Z direction as a depth direction. Herein, an average depth of the slits 261 may preferably be greater than an average width of the slits 261. Note that, in the reflection unit 200 according to the present embodiment, the prism 10 is formed with, in the reflective surface contact surface 202, the plurality of slits 261 of a different depth, and the average depth of the slits 261 is greater than the average width of the slits 261. An adhesive agent is injected into the interior of the slits 261, However, when the slits 261 are shallow, an adhesive force of the adhesive agent may not be fully utilized. This is because the adhesive agent may peel off from the slits 261. However, forming the slits 261 deeply as in the present embodiment enables acquiring a large adhesive force. Thus, the optical unit 1 according to the present embodiment prevents the prism 10 from coming off the reflection unit 200.

In the optical unit 1 according to the present embodiment, the plurality of slits 261 are aligned in the +Z direction as a depth direction. In this configuration, it is possible to form a large number of slits 261, and it is possible to particularly advantageously prevent the prism 10 from coming off the reflection unit 200. However, the plurality of slits 261 may not be aligned in the depth direction.

As shown in FIGS. 14 and 15, in the reflection unit 200 according to the present embodiment, a −Y direction side end portion 203f and a −Z direction side end portion 203g of a side surface contact surface 203 are chamfered. Although a side surface 10d of the prism 10 is attached to the side surface contact surface 203 by an adhesive agent, an adhesive strength of the prism 10 and the reflection unit 200 is particularly increased by using the chamfered area as an adhesive reservoir.

Embodiment 11

Figure 16:
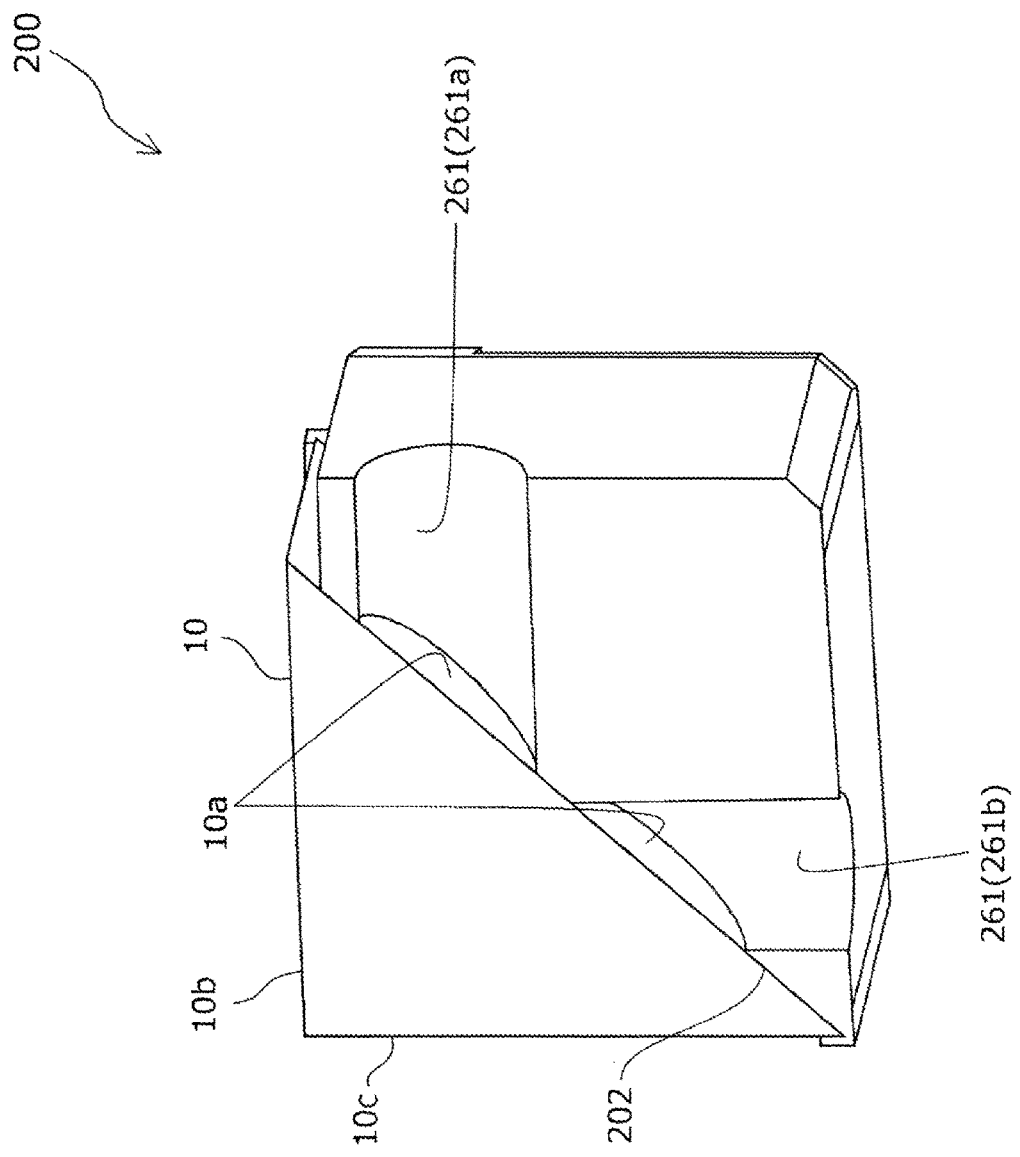
FIG. 16 is a schematic cross-sectional perspective view of a reflection unit of an optical unit according to Embodiment 11 of the present invention.

Next, an optical unit 1 according to Embodiment 11 is described with reference to FIG. 16. Herein, FIG. 16 is a perspective view of a reflection unit 200 of the optical unit 1 according to Embodiment 11 of the present invention. Note that, components common to those of Embodiments 1 to 10 are indicated by the same reference signs, and detailed description thereof is omitted. The optical unit 1 according to the present embodiment has a configuration similar to the configuration of the optical unit 1 according to Embodiment 1 except for a configuration of a portion described below. For this reason, the optical unit 1 according to the present embodiment has technical features similar to those of the optical unit 1 according to Embodiment 1 except for the portion described below.

As shown in FIGS. 14 and 15, in the optical unit 1 according to Embodiment 10, the plurality of slits 261 are aligned in the +Z direction as the depth direction. On the other hand, as shown in FIG. 16, in the optical unit 1 according to the present example, two slits 261, namely, a slit 261a and a slit 261b are formed, but depth directions thereof are not aligned. The depth direction of the slit 261a is the +Z direction, and the depth direction of the slit 261b is the +Y direction.

Herein, in the optical unit 1 according to the present embodiment, each of the plurality of slits 261 penetrates in the depth direction. Specifically, the slit 261a penetrates in the +Z direction, and the slit 261b penetrates in the +Y direction. In this configuration, it is possible to inject an adhesive agent from the outside after the prism 10 is supported by the reflection unit 200, and it becomes easy to introduce the adhesive agent into the slits 261.

The present invention is not limited to the above-described embodiments, and can be achieved by various configurations as far as the configurations do not depart from the gist of the present invention. For example, technical features in an embodiment associated with technical features in each aspect described in Summary of the Invention can be replaced or combined as necessary to solve a part or all of the above-described problems, or to achieve a part or all of the above-described advantageous effects. Also, as far as the technical features are not described as essential ones in the present specification, they can be deleted as necessary.

What is claimed is:

1. An optical unit comprising:
   a reflective portion that reflects, on a reflective surface, an incident light flux incident from outside in a reflection direction toward an imaging element from an incident direction;
   a movable body to which the reflective portion is fixed;
   a fixed body; and
   a fixing member that fixes the movable body and the reflective portion,
   wherein the fixing member comes into planar contact with at least one of an incident surface that is a surface of the reflective portion on a side of the incident direction, and an exit surface that is a surface of the reflective portion on a side of the reflection direction by abutment.

2. An optical unit comprising:
   a reflective portion that reflects, on a reflective surface, an incident light flux incident from outside in a reflection direction toward an imaging element from an incident direction;
   a movable body to which the reflective portion is fixed;
   a fixed body; and
   a fixing member that fixes the movable body and the reflective portion,
   wherein the fixing member is a plate spring that is fixed to the reflective portion by holding the reflective portion between both side surfaces of the reflective portion on a side of an intersecting direction intersecting with the incident direction and the reflection direction, the fixing member being fixed to the movable body.

3. The optical unit according to claim 1, wherein
   the movable body comprises a reflective surface contact surface in contact with the reflective surface, and
   the fixing member comes into contact with, at a position facing the reflective surface contact surface, a part of an incident surface that is a surface of the reflective portion on a side of the incident direction, and a part of an exit surface that is a surface of the reflective portion on a side of the reflection direction.

4. An optical unit comprising:
   a reflective portion that reflects, on a reflective surface, an incident light flux incident from outside in a reflection direction toward an imaging element from an incident direction;
   a movable body to which the reflective portion is fixed;
   a fixed body; and
   a fixing member that fixes the movable body and the reflective portion,
   wherein the fixing member comprises a reflective surface support portion that supports the reflective surface, and a holding portion that holds the reflective portion between both side surfaces of the reflective portion on a side of an intersecting direction intersecting with the incident direction and the reflection direction,
   the movable body comprises a reflective surface support portion contact surface in contact with the reflective surface support portion, and
   a slit is formed in a surface of the reflective surface support portion in contact with the reflective surface support portion contact surface.

5. An optical unit comprising:
   a reflective portion that reflects, on a reflective surface, an incident light flux incident from outside in a reflection direction toward an imaging element from an incident direction;
   a movable body to which the reflective portion is fixed;
   a fixed body; and
   a fixing member that fixes the movable body and the reflective portion,
   wherein the fixing member comprises a reflective surface support portion that supports the reflective surface, and a holding portion that holds the reflective portion between both side surfaces of the reflective portion on a side of an intersecting direction intersecting with the incident direction and the reflection direction,
   the movable body comprises a reflective surface support portion contact surface in contact with the reflective surface support portion, and
   a slit is formed in a surface of the reflective surface support portion in contact with the reflective surface support portion contact surface,
   wherein the holding portion comprises, at a position facing the reflective surface support portion, a regulation portion in contact with a part of an incident surface that is a surface of the reflective portion on a side of the incident direction, and a part of an exit surface that is a surface of the reflective portion on a side of the reflection direction.

* * * * *